US012010989B2

(12) United States Patent
Marwah et al.

(10) Patent No.: US 12,010,989 B2
(45) Date of Patent: Jun. 18, 2024

(54) ROACH GEL FORMULATIONS (71) Applicant: S.C. Johnson & Son, Inc., Racine, WI (US)

(72) Inventors: Pankaj Marwah, Oak Creek, WI (US); Maciej K. Tasz, Racine, WI (US); Kevin Welzel, Milwaukee, WI (US)

(73) Assignee: S. C. JOHNSON & SON, INC., Racine, WI (US)

(*) Notice: Subject to any disclaimer, the term of this patent is extended or adjusted under 35 U.S.C. 154(b) by 388 days.

(21) Appl. No.: 16/676,618

(22) Filed: Nov. 7, 2019

(65) Prior Publication Data

US 2021/0137101 A1    May 13, 2021

(51) Int. Cl.
*A01N 25/04* (2006.01)
*A01N 25/00* (2006.01)
*A01N 43/56* (2006.01)
*A01N 47/38* (2006.01)
*A01N 47/44* (2006.01)

(52) U.S. Cl.
CPC ........... *A01N 25/04* (2013.01); *A01N 25/006* (2013.01); *A01N 43/56* (2013.01); *A01N 47/38* (2013.01); *A01N 47/44* (2013.01)

(58) Field of Classification Search
CPC .... A61K 2800/48; A01N 65/00; A01N 25/22; A01N 27/00; A01N 53/00; A01N 25/006; A01N 25/04
See application file for complete search history.

(56) References Cited

U.S. PATENT DOCUMENTS

| | | | |
|---|---|---|---|
| 6,451,731 B1* | 9/2002 | Agbaje | A01N 57/20 514/937 |
| 7,048,918 B2 | 5/2006 | Warner et al. | |
| 7,227,025 B2 | 6/2007 | Freudenberger et al. | |
| 7,232,836 B2 | 6/2007 | Lahm et al. | |
| 7,402,676 B2 | 7/2008 | Freudenberger | |
| 7,622,595 B2 | 11/2009 | Annis et al. | |
| 7,696,233 B2 | 4/2010 | Lahm et al. | |
| 7,897,630 B2 | 3/2011 | Lahm et al. | |
| 7,902,231 B2 | 3/2011 | Lahm et al. | |
| 7,932,395 B2 | 4/2011 | Annis | |
| 8,142,801 B2 | 3/2012 | Jones | |
| 8,148,521 B2 | 4/2012 | Lahm et al. | |
| 8,158,802 B2 | 4/2012 | Lahm et al. | |
| 8,414,875 B2 | 4/2013 | Shih et al. | |
| 8,697,734 B2 | 4/2014 | Lahm et al. | |
| 8,834,908 B2 | 9/2014 | Jones | |
| 8,889,725 B2 | 11/2014 | Gutsmann et al. | |
| 8,921,400 B2 | 12/2014 | Lahm et al. | |
| 8,975,292 B2 | 3/2015 | Taranta et al. | |
| 9,029,365 B2 | 5/2015 | Lahm et al. | |
| 9,049,861 B2 | 6/2015 | Lahm et al. | |
| 9,049,862 B2 | 6/2015 | Lahm et al. | |
| 9,073,910 B2 | 7/2015 | Lahm et al. | |
| 9,078,437 B2 | 7/2015 | Lahm et al. | |
| 9,084,422 B2 | 7/2015 | Lahm et al. | |
| 9,089,122 B2 | 7/2015 | Olson et al. | |
| 9,113,630 B2 | 8/2015 | Lahm et al. | |
| 9,155,306 B2 | 10/2015 | Radabaugh et al. | |
| 9,295,247 B2 | 3/2016 | Olson et al. | |
| 9,445,593 B1 | 9/2016 | Lahm et al. | |
| 9,756,857 B2 | 9/2017 | Jones | |
| 10,264,777 B2 | 4/2019 | Zhang et al. | |
| 2005/0075372 A1 | 4/2005 | Lahm et al. | |
| 2005/0252074 A1 | 11/2005 | Duston et al. | |
| 2007/0071785 A1 | 3/2007 | Craven et al. | |
| 2008/0249190 A1 | 10/2008 | Jensen et al. | |
| 2010/0028295 A1* | 2/2010 | Taranta | A01N 25/06 424/84 |
| 2010/0160307 A1 | 6/2010 | Lahm et al. | |
| 2011/0046124 A1 | 2/2011 | Scheffran et al. | |
| 2012/0017491 A1 | 1/2012 | Gutsmann et al. | |
| 2013/0123104 A1* | 5/2013 | McKnight | A01N 25/02 504/362 |
| 2016/0150775 A1 | 6/2016 | Berengardt et al. | |
| 2018/0288999 A1 | 10/2018 | Spomer et al. | |
| 2019/0021311 A1* | 1/2019 | Krause | A01N 39/00 |

FOREIGN PATENT DOCUMENTS

| | | |
|---|---|---|
| EP | 1638767 B1 | 1/2008 |
| EP | 1416797 B1 | 6/2010 |
| EP | 2360157 A1 | 8/2011 |
| EP | 1966195 B1 | 2/2012 |
| EP | 2198708 B1 | 4/2012 |

(Continued)

OTHER PUBLICATIONS

Evonik, "Aerosil® 200", product information sheet, Apr. 2021, obtained from URL: https://products-re.evonik.com/www2/uploads/productfinder/AEROSIL-200-EN.pdf, obtained on Dec. 16, 2021 (Year: 2021).*

Fardisi et al. "Development of Diagnostic Insecticide Concentrations and Assessment of Insecticide Susceptibility in German Cockroach (Dictyoptera: Blattellidae) Field Strains Collected From Public Housing" Journal of Economic Entomology, vol. 110, Issue 3, Mar. 20, 2017, pp. 1210-1217, Retrieved from Internet. URL: https://doi.org/10.1093/jee/tox076.

Min-Ho Oh et al: "Rheological Evidence for the Silica-Mediated Gelation of Xanthan Gum", Journal of Colloid and Interface Science, vol. 216, No. 2, Aug. 1999, pp. 320-328, XP055764544.

(Continued)

*Primary Examiner* — Robert T. Crow
*Assistant Examiner* — John P Nguyen
(74) *Attorney, Agent, or Firm* — Quarles & Brady LLP (57) ABSTRACT

An insecticidal gel formulation including an insecticide active agent, sugar, sorbitol, hydrophilic fumed silica, xanthan gum, and a solvent is disclosed. Further, the insecticidal gel formulation comprises a total amount of hydrophilic fumed silica and xanthan gum of at least 3.6% by weight of the total insecticidal gel formulation.

27 Claims, 3 Drawing Sheets
(2 of 3 Drawing Sheet(s) Filed in Color)

(56) References Cited

FOREIGN PATENT DOCUMENTS

| | | |
|---|---|---|
| EP | 1996015 B1 | 4/2013 |
| EP | 1417175 B1 | 7/2013 |
| EP | 2632273 A1 | 9/2013 |
| EP | 3025583 A1 | 6/2016 |
| EP | 3358949 A1 | 8/2018 |
| EP | 2525655 B1 | 11/2018 |
| EP | 3422853 A1 | 1/2019 |
| WO | 9963960 A1 | 12/1999 |
| WO | 2006023783 A1 | 3/2006 |
| WO | 2006055275 A1 | 5/2006 |
| WO | 2006088653 A2 | 8/2006 |
| WO | 2008031870 A2 | 3/2008 |
| WO | 2009087085 A2 | 7/2009 |
| WO | 2010025454 A2 | 3/2010 |
| WO | 2011083485 A1 | 7/2011 |
| WO | 2011089105 A1 | 7/2011 |
| WO | 2012107266 A1 | 8/2012 |
| WO | 2012170836 A1 | 12/2012 |
| WO | 2017062305 A1 | 4/2017 |
| WO | 2017079684 A1 | 5/2017 |
| WO | 2017151549 A1 | 9/2017 |
| WO | 2017202882 A1 | 11/2017 |
| WO | 2018057882 A1 | 3/2018 |
| WO | 2018118740 A1 | 6/2018 |
| WO | 2018162954 A1 | 9/2018 |
| WO | 2019027249 A1 | 2/2019 |

OTHER PUBLICATIONS

International Search Report from corresponding PCT Application No. PCT/US2020/056475, dated Jan. 27, 2021, (5 pages).
International Written Opinion of the International Searching Authority from corresponding PCT Application No. PCT/US2020/056475, dated Jan. 27, 2021 (6 pages).
Search Strategy Report from corresponding PCT Application No. PCT/US2020/056475, dated Jan. 27, 2021 (1 page).

* cited by examiner

ROACH GEL FORMULATIONS

CROSS REFERENCE TO RELATED APPLICATIONS

Not applicable.

REFERENCE REGARDING FEDERALLY SPONSORED RESEARCH OR DEVELOPMENT

Not applicable.

SEQUENCE LISTING

Not applicable.

BACKGROUND

1. Technology Field

The present disclosure relates to an insecticidal composition and, more particularly, to a gel insecticidal composition, that comprises at least an insecticide active agent, sugar, and at least one structuring agent, and effectively kills crawling insects.

2. Description of the Background

Insecticide has been used over the years to prevent insects from attacking humans, animals, and crops. Diseases transmitted by insects are a major health hazard. Insects (mosquitoes, flies, cockroaches, and the like) transmit a number of diseases caused by the exposure of the victim to infectious agents such as viruses (chikungunya virus, yellow fever, dengue fever, etc.), bacteria (Lyme disease, plague, etc.), and parasites (malaria, sleeping sickness, leishmaniasis, filariasis, etc.) carried by the insect.

Crawling insects, such as ants and cockroaches, are responsible for health and crop problems. Cockroaches in the home environment are a health hazard not only because of the risks posed by cockroach antigens to asthma sufferers, but also because they can carry disease-causing agents. Cockroaches may play a role as carriers of intestinal diseases, such as diarrhea, dysentery, typhoid fever, and cholera.

The most common species of cockroaches found in urban and residential areas are *Periplaneta americana* (American cockroach), *Blattella germanica* (German cockroach), *Blatta orientails* (Oriental cockroach), and *Suppella longipalpa* (brown-banded cockroach). The American cockroach is the largest species of common cockroaches. The German cockroach is probably the most common species found in the United States.

It is desirable to have a gel insecticidal composition with the ability to control and kill crawling insects in a quick and efficient manner in a single product that remains effective for a long period. It is desirable to have a gel insecticidal formulation that may be sugar- or protein-based. It is also desirable to have structuring agents that can be used with both sugar- and protein-based formulations. It is desirable to have a gel insecticidal composition that is off-white in color in a sugar-based formulation that is as effective of dark protein-based formulations. It is also desirable to have a gel insecticidal composition having an improved thixotropic system and good rheology.

SUMMARY

Embodiments of the current disclosure describe an insecticidal gel composition comprising an insecticide active ingredient (AI), sugar, sorbitol, hydrophilic fumed silica, and xanthan gum. In the present disclosure, Applicant demonstrates that the combination of these components unexpectedly provides both efficient pest control and lasting mortality.

In one embodiment, the insecticidal gel formulation comprises an insecticide active agent, sugar, sorbitol, hydrophilic fumed silica, xanthan gum, and a solvent. In the preferred embodiment, the total amount of the hydrophilic fumed silica and the xanthan gum is at least 3.6% of the total insecticidal gel formulation. In some embodiments, the insecticidal gel formulation comprises hydrophilic fumed silica and xanthan gum in an amount ranging from about 2.5% to about 4.0% and about 0.05% to about 0.5%, respectively, based on total weight of the insecticide gel formulation.

The insecticidal gel formulation may further include a protein. In this embodiment, the protein is in an amount of about 10% to about 25% based on total weight of the insecticide gel formulation. In the preferred embodiment, the protein is peanut butter.

The insecticidal gel formulation may further comprise an emulsifier. Also, the insecticidal gel formulation may further comprise a bittering agent. In some embodiments, the solvent of the insecticidal gel formulation is water.

In another embodiment, the insecticidal gel formulation comprises an insecticide active agent, sugar, sorbitol, hydrophilic fumed silica, xanthan gum, a bittering agent, and a solvent. This embodiment may further comprise a protein. In the preferred embodiment, the protein is peanut butter.

In another embodiment, the insecticidal gel formulation comprises an insecticide active agent, sugar, sorbitol, protein, hydrophilic fumed silica, xanthan gum, and a solvent. In the preferred embodiment, the protein is peanut butter.

In the preferred embodiments, the insecticidal gel formulations produce baits that kill and control insects. Further, the formulations have hydrophilic fumed silica and xanthan gum contents of at least 3.6% of the total insecticidal gel formulation. As such, the insecticidal gel formulation may provide an effective pest control for crawling insects, especially roaches.

BRIEF DESCRIPTION OF THE FIGURES

The patent or application file contains at least one drawing executed in color. Copies of this patent or patent application publication with color drawing(s) will be provided by the Office upon request and payment of the necessary fee.

DETAILED DESCRIPTION OF THE DISCLOSURE

Presently disclosed is a gel insecticidal formulation designed to control and kill crawling insects, particularly cockroaches, more effectively than other known compositions. In the pest control area, it is known that households tend to suffer from the presence of crawling insects such as cockroaches. Baits are a preferred type of formulation used in urban pest management, especially for the control of cockroaches. Baits can be packaged as pastes, gels, granules, or dusts. Insecticides formulated as gels are used in pest control. Most of the gel insecticide products available in the market tend to dry out over time, reducing their efficacy. What is needed in the industry is a gel insecticide composition that remains attractive to insects, does not dry out over a specified period of time, and can provide efficient pest control and mortality, particularly of roaches, compared to commonly available systems. Therefore, it is important to develop a gel insecticidal composition that can kill crawling insects in a timely fashion and for an extended period of time compared to commercially available formulations. It has been found that a gel insecticidal composition comprising various AIs and including structuring agents may provide such a benefit. The structuring agents may be used in both sugar- and protein-based formulations.

Figure 1:
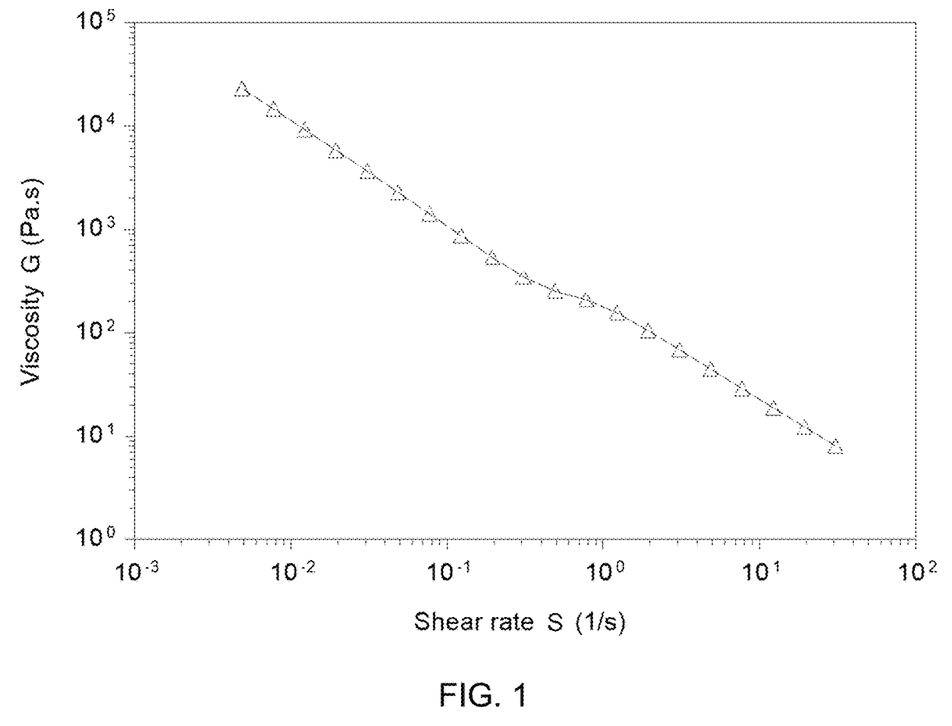
FIG. 1. Line graph showing rheology of the insecticidal gel formulation disclosed herein as a function of shear rate.
Figure 2:
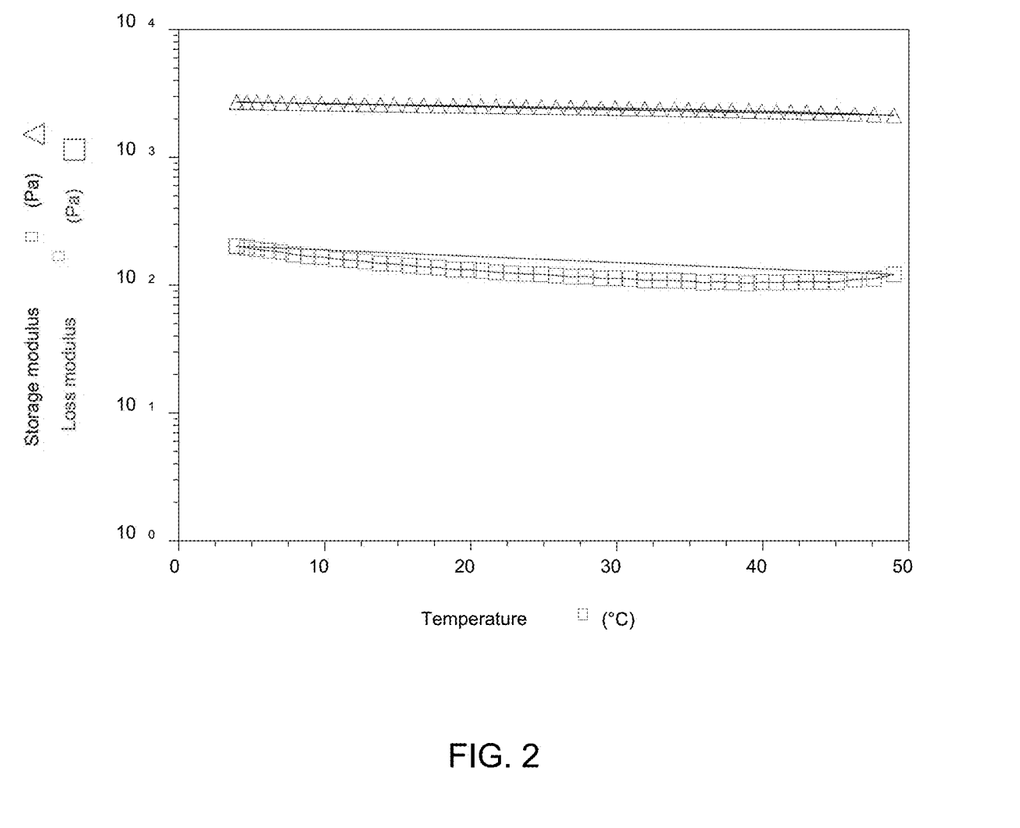
FIG. 2. Line graph showing rheology of the insecticidal gel formulation disclosed herein as a function of temperature.

The gel insecticidal formulation according to an embodiment of the present disclosure is a composition including an AI, sugar, sorbitol, hydrophilic fumed silica, and xanthan gum, which can be used in a water-based formulation. The formulations described herein present a novel combination of structuring agents, specifically hydrophilic fumed silica and xanthan gum, resulting in an improved thixotropic system, good rheology, and lasting mortality/kill benefits in American and German roaches. As shown in FIG. 1, the insecticidal gel formulation's viscosity decreases as the shear rate increases; this demonstrates that the insecticidal gel formulation flows under force. This also shows that once the insecticidal gel formulation is not under force, the gel remains intact. As shown in FIG. 2, the viscosity of the insecticidal gel formulation remains substantially the same as the temperature changes.

In certain embodiments, the insecticidal gel formulation comprises at least one insecticide AI. As used herein, "AI" or "active insecticide" or "insecticide active ingredient" or "active" refers to chemicals in pesticide products that kill, control, or repel pests. In certain embodiments, the total AI is present in the insecticidal gel formulation in an amount between about 0.01% to about 2.0% by weight of the total insecticidal gel formulation. In certain embodiments, the total AI is present in the insecticidal gel formulation in an amount between about 0.1% to about 1.0% by weight of the total insecticidal gel formulation. In certain embodiments, the total AI is present in the insecticidal gel formulation in an amount between about 0.4% to about 0.7% by weight of the total insecticidal gel formulation. Suitable AIs include, but are not limited to, fipronil, indoxacarb, dinotefuron, abamectin, imidacloprid, boric acid, hydromethylnon, thiamethoxam, and the like. While specific values chosen for this embodiment are recited, it is to be understood that, within the scope of the disclosure, the concentrations of the AIs may vary to suit different applications. The concentration ranges of AIs will vary based on the additional components of the insecticidal gel formulation, such as sugar, sorbitol, hydrophilic fumed silica, protein, and/or xanthan gum, and will vary based on the type of AI used in the formulation.

In certain embodiments, the insecticidal gel formulation comprises attractant systems. "Attractant systems," "attractant ingredients," and/or "food attractants," as used herein, refer to components used to a) entice the insect to approach the bait; b) entice the insect to contact and/or consume the bait; and/or c) entice the insect to return to the bait. It is desirable to provide an insecticidal gel formulation comprising a particular amount of attractant to be effective in attracting insects, such as cockroaches. In some embodiments, the attractant is or includes sugar. In some embodiments, the attractant is or includes a protein. In some embodiments, the attractant is a combination of sugar and protein.

In some embodiments, the attractant is or includes sugar. In certain embodiments, the sugar is about 10% to about 50% by weight of the total insecticidal gel formulation. In certain embodiments, the sugar is about 20% to about 40% by weight of the total insecticidal gel formulation. In certain embodiments, the sugar is about 20% to about 30% by weight of the total insecticidal gel formulation. In accordance with an exemplary embodiment, the sugar is about 25% by weight of the total insecticidal gel formulation. The amount of sugar may be measured based on the standard nutritional assessment of total sugar or based on the formulaic sugar content added during production of the insecticidal gel formulation. Sugar refers to any possible saccharide sugar. Sugar may include, but is not limited to, table sugar, sucrose, glucose alone, fructose alone, powdered sugar, corn syrup, high fructose corn syrup, and the like. In certain embodiments, the sugar is sucrose, wherein the sucrose is at least 20% by weight of the total insecticidal gel formulation.

In certain embodiments, the insecticidal gel formulation further comprises a second attractant. In certain embodiments, the insecticidal gel formulation further comprises a protein. In certain embodiments, the attractant is or includes a protein. In certain embodiments, the insecticidal gel formulation comprises a particular amount of protein to be effective in attracting insects, such as cockroaches. In certain embodiments, the protein is about 0.1% to about 30% by weight of the total insecticidal gel formulation. In certain embodiments, the protein is about 10% to about 25% by weight of the total insecticidal gel formulation. In certain embodiments, the protein is about 15% to about 20% by weight of the total insecticidal gel formulation. In accordance with an exemplary embodiment, the protein is about 17% by weight of the total insecticidal gel formulation. In certain embodiments, the insecticidal gel formulation is substantially free of protein.

In certain embodiments, the protein is soy-based or nut-based. Soy-based proteins may include, but are not limited to, soy flour, soy concentrate, macerated soybean, and soy isolate. Nut-based proteins may include, but are not limited to, peanut butter, macerated peanuts, macerated almond, macerated cashew, macerated pecan, macerated Brazil nuts, macerated hazelnut, macerated chestnut, macerated acorn, macerated pistachio, macerated walnut, macerated macadamia, peanuts, almonds, cashews, pecans, Brazil nuts, hazelnuts, chestnuts, acorns, pistachios, walnuts, macadamia nuts, and pine nuts.

In certain embodiments, the insecticidal gel formulation comprises sorbitol. In certain embodiments, the sorbitol is about 10% to about 50% by weight of the total insecticidal gel formulation. In certain embodiments, the sorbitol is about 20% to about 40% by weight of the total insecticidal gel formulation. In certain embodiments, the sorbitol is about 20% to about 30% by weight of the total insecticidal gel formulation. In accordance with an exemplary embodiment, the sorbitol is about 25% by weight of the total insecticidal gel formulation. In certain embodiments, the sorbitol is Sorbitol 70%, USP grade.

In certain embodiments, sorbitol acts as a humectant. In certain embodiments, sorbitol acts as an attractant. In certain embodiments, sorbitol acts as both an attractant and humectant.

It is desirable to provide an insecticidal gel formulation comprising a particular amount of at least one structuring agent allowing the insecticidal gel formulation to achieve improved efficacy. It will be apparent to a person skilled in the art that the identification of a suitable combination of structuring agents included in the insecticidal formulation producing a stable and effective insecticidal formulation is challenging and not obvious. In certain embodiments, the insecticidal gel formulation comprises structuring agents. As used herein, "structuring agent" refers to agents that increase the viscosity of the formulation. Structuring agents may include, but are not limited to, hydrophilic fumed silica and xanthan gum. In certain embodiments, the insecticidal gel formulation comprises at least one structuring agent. In certain embodiments, the insecticidal gel formulation comprises hydrophilic fumed silica and xanthan gum as structuring agents. The inclusion of structuring agents to the insecticidal gel formulation provides an improved thixotropic system and good rheology, which in turn results in a formulation that remains effective for an extended period of time. As used herein, an "improved thixotropic system" refers to the insecticidal gel formulation remaining gellified for about two years after application, thus remaining in place and attractive to the insects. As used herein, "rheology" refers to the study of deformation and flow within a material. A "good rheology" means that the insecticidal gel formulation remains a gel for about two years once it has been applied, and its components do not liquefy and flow out of the area upon which the gel formulation has been applied. Furthermore, the combination of hydrophilic fumed silica and xanthan gum is compatible with both sugar-based and protein-based attractant formulations. Importantly, the combination of hydrophilic fumed silica and xanthan gum provides the insecticidal gel formulation the advantage of compatibility with attractant agents, AIs, etc., and by remaining in gel form for about two years in order to provide efficient pest control and killing of insects. In certain embodiments, the total amount of hydrophilic fumed silica and xanthan gum in the insecticidal gel formulation is at least 3.6% by weight of the total insecticidal gel formulation. In certain embodiments, the hydrophilic fumed silica is about 2.0% to about 4.5% by weight of the total insecticidal gel formulation. In certain embodiments, the hydrophilic fumed silica is about 2.5% to about 4.0% by weight of the total insecticidal gel formulation. In accordance with an exemplary embodiment, the hydrophilic fumed silica is about 3.5% by weight of the total insecticidal gel formulation. In certain embodiments, the xanthan gum is about 0.01% to about 1.0% by weight of the total insecticidal gel formulation. In certain embodiments, the xanthan gum is about 0.05% to about 0.5% by weight of the total insecticidal gel formulation. In certain embodiments the xanthan gum is about 0.1% to about 0.2% by weight of the total insecticidal gel formulation. In accordance with an exemplary embodiment, the xanthan gum is about 0.15% by weight of the total insecticidal gel formulation. While specific values chosen for this embodiment are recited, it is to be understood that, within the scope of the disclosure, the concentrations of all the structuring agents may vary to suit different applications.

In certain embodiments, the insecticidal gel formulation further comprises an emulsifier. Emulsifiers may include, but are not limited to, sorbitan stearates, glyceryl monooleates, lecithin, lanolin alcohols, cetearyl alcohol, polysorbates, sorbitan laurate, sorbitan monooleate, sorbitan monostearate, sorbitan monopalmitate, amphoteric and anionic surfactants, nonionic alkyl polyglucoside, and the like, and any combinations thereof. In certain embodiments, emulsifier is about 0.01% to about 2% by weight of the total insecticidal gel formulation. In certain embodiments, the emulsifier is about 0.5% to about 1.5% by weight of the total insecticidal gel formulation. In accordance with an exemplary embodiment, the emulsifier is about 1.0% by weight of the total insecticidal gel formulation.

In certain embodiments, the insecticidal gel formulation further comprises a bittering agent. Such embodiments may comprise a bittering agent at about 0.01% to about 0.1% by weight of the total insecticidal gel formulation. Bittering agents may include, but are not limited to, guinea pepper powder, denatonium benzoate, and the like, and any combinations thereof. Bittering agents are generally used to make gel formulations unappealing to humans and other mammals who should not ingest it.

In certain embodiments, the solvent of the insecticide gel formulation is water. In certain embodiments, the water is present at about 5% to about 95% by weight of the total insecticidal gel formulation.

In some embodiments, the insecticide gel formulation is a water-based formulation and includes an AI, sugar, sorbitol, hydrophilic fumed silica, and xanthan gum. In certain embodiments, the water is present at about 10% to about 50% by weight of the total insecticidal gel formulation, preferably, about 20% to about 45% by weight of the total insecticidal gel formulation. In certain embodiments, the water is present in about 25% to about 45% by weight of the total insecticidal gel formulation.

In certain embodiments, the insecticide gel formulation is a water-based formulation and includes an AI, sugar, sorbitol, hydrophilic fumed silica, xanthan gum, and a bittering agent. In certain embodiments, the water is present at about 10% to about 50% by weight, preferably, about 20% to about 45% by weight. In certain embodiments, the water is present in about 25% to about 45% by weight.

In certain embodiments, the insecticide gel formulation is a water-based formulation and includes an AI, sugar, sorbitol, protein, hydrophilic fumed silica, and xanthan gum. In certain embodiments, the water is present at about 5% to about 50% by weight. In certain embodiments, the water is present at about 10% to about 40% by weight. In certain embodiments, the water is present in about 15% to about 35% by weight.

The gel insecticidal formulation according to an embodiment of the present disclosure provides a formulation that is lighter in color than known formulations. A "lighter in color" formulation refers to a formulation that is substantially void of a dark color such as brown, black, blue, among other dark colors. Suitable lighter in color formulations may be translucent, transparent, clear, white, off-white color, unclouded, see-through formulations, and the like. In certain embodiments, the off-white color formulation includes an AI, sugar, sorbitol, hydrophilic fumed silica, xanthan gum, and water.

While specific values of the solvents are chosen for these embodiments, it is to be understood that, within the scope of the disclosure, this value may vary over wide ranges to suit different applications. For example, the weight percentage of the solvent may increase to dissolve the proteins when, for example, there are additional proteins in one formulation compared to another. Another example, the weight percentage of the solvent may increase to dissolve the AIs when, for example, there are additional AIs in one formulation compared to another. The weight percentage of the solvent is balanced to effectively dissolve the AIs.

As used herein, a "moribund" insect refers to an insect incapacitated. This insect incapacitation is characterized by uncoordinated movement of legs, antennae, and other body parts. A moribund insect unable to right itself on its feet upon prodding is considered the beginning of mortality. As used herein, a "dead" or "killed" insect refers to an insect with absolutely no movement, no twitching, no antenna moving, etc., according to EPA standards. A dead insect is probed or subjected to other stimuli to verify lack of movement. As used herein, "pest control" or "pest management" of insects, namely cockroaches, is considered to be effective means for inhibition of insects' development, including mortality, feeding reduction, and/or mating disruption. It is desirable to not only attract the insect, but to kill insects to avoid the breeding of pests, via an effective formulation. As used herein, "effective formulation" refers to a formulation where the insect is attracted to the formulation and feeds off the formulation, and the formulation effectively kills the insect. As such, it is desirable to have a gel insecticidal formulation capable of attracting and killing insects while remaining active for several days, months, and years. The present insecticidal gel formulation has a two-year shelf life.

The currently disclosed insecticidal gel formulation exhibits an effective killing rate against insects, such as cockroaches, compared to others tested gel insecticidal formulations. An "effective killing rate", as used herein, refers to the amount of dead insects by a specific amount of time, after the insects contacts and/or consumes the formulation. An example of an effective killing rate may be the death of an insect 24 hours after the insect contacts and/or consumes the bait. Another example of an effective killing rate may be the death of an insect in 2 to 4 days after the insect contacts and/or consumes the bait. In certain embodiments, the effective killing rate is the death of at least a majority of insects (e.g. 50%) by the third day after the insect contacts and/or consumes the bait. In certain embodiments, the effective killing rate is the death of at least 85% of insects in a group by the fifth day after the insect contacts and/or consumes the bait. In certain embodiments, the effective killing rate is the death of at least 90% of insects in a group by the seventh day after the insect contacts and/or consumes the bait.

The disclosed insecticidal gel formulation offers improved efficacy in controlling insect pests, such as cockroaches. An example of "efficient control" of insects, as used herein, refers to the amount of insecticidal gel formulation that provides an attractive bait such that at least a majority of insects (e.g., 51, 55, 60, 65, 70, 75, 80, 85, 90, 95, 100%) in a group or nest consumes the bait. For example, the rate of consumption of the insect bait by a particular group or nest of insects can be measured by placing a container of insect bait of the disclosure close to or on a trail of the insects and taking regular measurements of insect bait consumed.

Another example of "efficient control" is the effective residual agent. In certain embodiments, the disclosed insecticidal gel formulation offers a good residual activity. A "residual active agent" refers to an insecticide agent that turns the infected cockroaches and their fluids, into bait themselves. These long active AIs, when mixed with a bait, allow the poisoned insect time to return to the colony or harborage and infect others. The disclosed insecticidal gel formulation remains attractive to insects and effective in killing insects for about two years after application.

Further, in accordance to the presently disclosed insecticidal gel formulation, once the insect feeds off the disclosed insecticidal gel formulation, the insect begins to die approximately 24 hours after consumption of the disclosed insecticidal gel formulation.

Any of the embodiments described herein may be modified to include any of the structures, compositions, or methodologies disclosed in connection with different embodiments.

EXAMPLES

Formulation A is a sugar-based formulation and comprises about 0.5% to about 0.6% AI; about 25% sugar; about 25% sorbitol; about 3.5% hydrophilic fumed silica; about 0.15% xanthan gum; about 2% of peanut oil; about 1% emulsifier; about 0.05% bittering agent; and about 42% to about 43% water.

Formulation B is a protein-based formulation and comprises 0.5% to about 0.6% AI; about 25% sugar; about 25% sorbitol; about 3.5% hydrophilic fumed silica; about 0.15% xanthan gum; about 17% peanut butter; about 2% of peanut oil; about 1% emulsifier; about 0.05% bittering agent; and about 25% to about 26% water.

Example 1

Efficacy of Formulations A and B Against German Roaches

Methodology

Choice Bioassays

Choice bioassays were performed in 5.9-liter rectangular plastic containers with vented lids (*Bella* Storage Solutions, Leominster, MA). The inner top portions of the boxes/bioassay arenas were lightly coated with a mixture of petroleum jelly and mineral oil to prevent insect escape and confine insects to the lower portions of the box. Twenty five (25) *Blattella germanica* (five adult males, five adult females and fifteen 3-week old nymphs) were acclimated to the bioassay arenas for 24 h. During the acclimation period insects were provided harborage and water source, but no rodent chow i.e., the insects were starved for 24 h. After the 24 h starvation or acclimation period, groups of 25 cockroaches were provided about 0.3 g to 0.5 g of respective bait in a plastic lid (SOLO company 1 oz. container lid). Rodent chow or diet (Harlan-Teklad Rodent Diet #8604) was provided as an alternative food source. Five replicates (25 insects/replicate) were performed for each bait/formulation.

Bioassays were scored for mortality on days 1, 3, 5, 7, 10 and 14. Both moribund and dead insect data were collected, but mortality data for different life stages was not recorded separately. Controls included insects that were provided rodent chow only.

Mortality Scoring Procedures

Two types of mortality data were collected in this Example. In the first dataset termed as "Moribund+Dead" insect incapacitation was characterized by uncoordinated movement of legs, antennae, and other body parts, and inability of cockroaches to walk or right themselves upon prodding, and was considered as the point of mortality initiation. In this dataset, observation intervals beyond day 1 also included dead insects that did not respond to prodding, hence the name of this dataset "Moribund+Dead" (Table 1).

In another form of data, termed as "Dead" insect dataset, complete death of insects as characterized by a lack of body movement was considered as the point of mortality initiation (Table 2).

Bait Consumption

Feeding quantification was performed after the first 24 h of the bioassay. Appropriate weight-loss control treatments were included to quantify bait consumption. In brief, treatments to quantify the water loss or gain by respective baits included bioassay arenas without insects. Bait consumption was estimated using the following formula: $\{W_O*(1-\%$ water loss controls)$\}-W_n$, where $W_O$ is weight of bait before initiation of bioassays and $W_n$ is weight of bait at 24 h (Table 3).

no statistically significant mortality differences between formulations (P>0.05). In terms of the formulations with indoxacarb as an active ingredient, Formulation E (0.6% indoxacarb) and Formulation A bait (0.3% indoxacarb) caused 90% mortality by day 3, but Formulation B bait (0.3% indoxacarb) provided 90% or higher mortality by day 5.

TABLE 1

Percentage of moribund + dead German cockroaches in different treatments.

| Treatment | % Moribund + dead (±Standard Error) | | | | | |
|---|---|---|---|---|---|---|
| | Day 1 | Day 3 | Day 5 | Day 7 | Day 10 | Day 14 |
| Formulation A | 66 (±5)a | 90 (±4)a | 94 (±3)a | 94 (±3)ab | 98 (±1)ab | 99 (±1)a |
| Formulation B | 70 (±6)a | 86 (±4)a | 91 (±2)a | 98 (±1)a | 98 (±1)ab | 99 (±1)a |
| Formulation C | 59 (±5)a | 80 (±2)a | 83 (±2)b | 90 (±3)b | 94 (±2)b | 98 (±2)a |
| Formulation D | 71 (±2)a | 92 (±1)a | 97 (±1)a | 99 (±1)a | 100 (±0)a | 100 (±0)a |
| Formulation E | 71 (±3)a | 90 (±2)a | 96 (±2)a | 98 (±2)a | 98 (±2)ab | 98 (±2)a |
| Control | 2 (±1)b | 4 (±0)b | 5 (±1)c | 6 (±1)c | 6 (±1)c | 7 (±1)b |

Strain Information

A German cockroach strain field-collected from Indianapolis, Indiana in 2014-15 (named as I-IN or Laurelwood) was used for this study (Fardisi et al. 2017; https://doi.org/10.1093/jee/tox076).

Formulations Used.

Formulations A and B of the present disclosure were compared to commercially available gel formulations C, D, and E.
1. Formulation A (0.3% indoxacarb)
2. Formulation B (0.3% indoxacarb)
3. Formulation C (0.05% dinotefuran)
4. Formulation D (0.01% fipronil)
5. Formulation E (0.6% indoxacarb)
6. Control (rodent chow)

Data Analysis

Analysis of Variance ANOVA (P<0.05) was used to analyze the mortality data followed by a LSD (least significant difference) means separation test. The same statistical analysis procedure was used to determine if there were significant differences in consumption of different baits.

Within each column, percent mortality values that are not connected with the same letter are significantly different (ANOVA and LSD test P<0.05).

Dead Dataset

Data for dead German cockroaches are shown in Table 2. Mortality in controls (rodent chow) was <10% at all observation periods. Formulation C and Formulation D provided higher mortality of cockroaches at day 1 (30 and 18%, respectively) in comparison to the indoxacarb-containing formulations (<10% mortality). By day 3, mortality levels in all of the formulations were >60% but less than 90%. Formulation D and Formulation E resulted in 90% or higher mortality by day 5, whereas Formulation A and Formulation B caused >90% mortality at day 7. Formulation C provided >90% mortality by day 10. At day 10 or day 14 there were no significant differences in mortality levels between different formulations (P>0.05). Among the indoxacarb-containing formulations, Formulation E showed the fastest speed of kill (90% mortality in 5 days), followed by Formulation A and Formulation B (90% mortality in 7 days).

TABLE 2

Percentage of dead German cockroaches in different treatments.

| Treatment | % dead (±Standard Error) | | | | | |
|---|---|---|---|---|---|---|
| | Day 1 | Day 3 | Day 5 | Day 7 | Day 10 | Day 14 |
| Formulation A | 4 (±0)c | 66 (±5)ab | 87 (±3)ab | 90 (±3)ab | 97 (±1)a | 99 (±1)a |
| Formulation B | 2 (±2)c | 72 (±4)ab | 84 (±3)ab | 94 (±2)ab | 98 (±1)a | 98 (±1)a |
| Formulation C | 30 (±5)a | 66 (±3)b | 77 (±3)b | 87 (±3)b | 93 (±1)a | 97 (±1)a |
| Formulation D | 18 (±2)b | 80 (±4)ab | 94 (±3)a | 98 (±1)a | 100 (±0)a | 100 (±0)a |
| Formulation E | 6 (±3)c | 84 (±4)a | 91 (±3)a | 97 (±2)a | 98 (±2)a | 98 (±2)a |
| Control | 2 (±1)c | 4 (±0)c | 5 (±1)c | 6 (±1)c | 6 (±1)b | 7 (±1)b |

Results

Moribund+Dead Dataset

Data for moribund+dead German cockroaches are shown in Table 1. Mortality in the control treatment was 7 (±1)%. At day 1, all of the formulations resulted in >50% mortality. By day 3, Formulation D, Formulation E, and Formulation A resulted in 90% or higher mortality. However, no formulation-dependent mortality differences were observed at day 3. Mortality was 90% or higher in all formulations by day 5, except in Formulation C. By day 7, all of the formulations provided 90% or higher mortality and by day 14 there were Within each column, percent mortality values that are not connected with the same letter are significantly different (ANOVA and LSD test P<0.05).

Bait Consumption

Average bait consumption estimates for 25 German cockroaches after the first 24 hours of the bioassay are shown in Table 3. Bait consumption for Formulation E was the highest in comparison to other products. Bait consumption values for Formulation A and Formulation B were similar to Formulation D, but were significantly higher than Formulation C.

TABLE 3

Bait consumption estimates for the first 24 h of the bioassay.

| Treatment | Bait consumption (g) at 24 h by 25 German cockroaches (± Standard Error) |
|---|---|
| Formulation A | 0.114 (±0.011)b |
| Formulation B | 0.103 (±0.008)b |
| Formulation C | 0.068 (±0.01)c |
| Formulation D | 0.093 (±0.012)bc |
| Formulation E | 0.212 (±0.005)a |

Estimates are based on average bait consumption by 25 German cockroaches (×5 replicates total). Consumption estimates connected by different letters are significantly different (ANOVA and LSD test, P<0.05).

Summary of Results
1. All formulations tested in this study provided >90% mortality of German cockroaches by day 14.
2. In both "moribund+dead" and "dead" datasets, Formulation D (0.01% fipronil) was the first to provide 90 to 100% mortality.
3. Among the indoxacarb-containing formulations, Formulation E (0.6% indoxacarb), Formulation A (0.3% indoxacarb) and Formulation B showed more or less similar speed of kill (90% mortality in 5 to 7 days).
4. Formulation E was the most consumed bait in the first 24 hours of the bioassay (0.212 g), followed by Formulation A (0.114 g), Formulation B (0.103 g), Formulation D (0.093 g), and Formulation C (0.068 g) baits.

Example 2

Efficacy of Formulations A and B Against American Roaches

Methodology

Choice Bioassays

Choice bioassays were performed in 12-liter Sterlite plastic boxes (Townsend, MA). The inner top portions of the boxes or bioassay arenas were lightly coated with a mixture of petroleum jelly and mineral oil to prevent insect escape and confine insects to the lower portions of the box. Twenty five (25) *Periplaneta americana* (five adult males, five adult females, five eight-week old nymphs and ten four-week old nymphs) were acclimated to the bioassay arenas for 24 hours. During the acclimation period insects were provided harborage and water source, but no rodent chow i.e., the insects were starved for 24 hours. After the 24 hour starvation or acclimation period, groups of 25 cockroaches were provided ~1.0 g of respective bait in a plastic dish. Rodent chow or diet (Harlan-Teklad Rodent Diet #8604) was provided as an alternative food source. Five replicates (25 insects/replicate) were performed for each bait. Bioassays were scored for mortality on days 1, 3, 5, 7, 10 and 14. Both moribund and dead insect data were collected, but mortality data for different life stages was not recorded separately. Control treatment included insects that were provided rodent chow only.

Mortality Scoring Procedures

Two types of mortality data were collected. In the first dataset termed as "Moribund+Dead" insect incapacitation as characterized by uncoordinated movement of legs, antennae, and other body parts and inability of knockdown cockroaches to right themselves on their feet upon prodding was considered as point of mortality initiation. In this dataset, observation intervals beyond day 1 also included dead insects that did not respond to prodding, hence the name of this dataset "Moribund+Dead" (Table 4). In another dataset, termed as "Dead" insect dataset, complete death of insects as characterized by absence of body movement was considered as the point of mortality initiation (Table 5).

Bait Consumption

Feeding quantification was performed after the first 24 hours of the assay. Appropriate weight-loss control treatments were included to quantify bait consumption. In brief, treatments to quantify the water loss or gain by respective baits included bioassay arenas without insects. Bait consumption was estimated using the following formula: $\{W_O* (1-\% \text{ water loss controls})\}-W_n$, where $W_O$ is weight of bait before initiation of bioassays and $W_n$ is weight of bait at 24 hours (Table 6).

Strain Information

The Scott strain of the American cockroach, which has been maintained in the laboratory for more than 10 years without any insecticide selection pressure, was used for this Example.

Formulations Used

Formulations A and B of the present disclosure were compared to commercially available gel formulations C, D, and E.

1. Formulation A (0.3% indoxacarb)
2. Formulation B (0.3% indoxacarb)
3. Formulation C (0.05% dinotefuran)
4. Formulation D (0.01% fipronil)
5. Formulation E (0.6% indoxacarb)
6. Control (rodent chow)

Data Analysis

Analysis of Variance ANOVA (P<0.05) was used to analyze the mortality data followed by a LSD (least significant difference) means separation test. The same statistical analysis procedure was used to determine if there were significant differences in consumption of different bait products.

Results

Moribund+Dead Dataset

Percentage of moribund+dead cockroaches are shown in Table 4. Mortality in the control (rodent chow) treatments was 1% at day 1 and increased to 2% at day 14. When morbidity was considered as the point of mortality initiation, Formulation D provided the highest (32%) mortality at day 1 and in all other formulations mortality ranged from 5 to 20%. By day 3, mortality was around 50% for Formulations A and B, and around 70 to 75% for Formulation D and Formulation E. However, mortality observed in Formulation C was significantly lower (37%) at day 3. Mortality in the Formulation D bait treatment was >90% at day 5, whereas in the Formulation E and Formulation A, mortality crossed the 90% mark at day 7. For Formulation B>90% mortality was observed at day 10. At both day 10 and day 14 observation intervals, mortality levels (>90%) were statistically similar between Formulation D, Formulation E, Formulation A, and Formulation B. In contrast, Formulation C provided significantly lower mortality (52% at day 14) of American cockroaches.

TABLE 4

Percentage of moribund + dead American cockroaches in different treatments.

| | % Moribund + Dead (±Standard Error) | | | | | |
|---|---|---|---|---|---|---|
| Treatment | Day 1 | Day 3 | Day 5 | Day 7 | Day 10 | Day 14 |
| Formulation A | 5 (±3)c | 54 (±3)b | 76 (±3)bc | 90 (±4)a | 95 (±3)a | 98 (±2)a |
| Formulation B | 6 (±1)c | 56 (±6)b | 69 (±6)c | 78 (±4)b | 91 (±5)a | 94 (±4)a |
| Formulation C | 20 (±4)b | 37 (±2)c | 47 (±4)d | 48 (±4)c | 50 (±5)b | 52 (±6)b |
| Formulation D | 32 (±5)a | 76 (±4)a | 93 (±2)a | 95 (±2)a | 98 (±2)a | 99 (±1)a |
| Formulation E | 16 (±3)b | 70 (±4)a | 83 (±5)ab | 94 (±3)a | 96 (±2)a | 98 (±1)a |
| Control | 1 (±1)c | 1 (±1)d | 1 (±1)e | 1 (±1)d | 2 (±2)c | 2 (±2)c |

Within each column, percent mortality values that are not connected with the same letter are significantly different (ANOVA and LSD test P<0.05).

Dead Dataset

Control mortality was 2% at day 14. When the death of insects was considered as the point of mortality initiation, percent mortality levels were less than 10% for all formulations at 1 d. (Table 5). After day 3 of exposure, about 50% mortality was observed in Formulation D, 37% in Formulation C, and 22% in Formulation E, however, only 6 and 11% mortality was observed for Formulation A and Formulation B, respectively. By day 5, 60 to 85% mortality was observed in Formulation E and Formulation D, respectively, but Formulations A and B provided<50% mortality at the same observation interval. At day 7, >50% mortality was observed in Formulation E, Formulation A, and Formulation B, and mortality in Formulation D surpassed the 90% mark. At the day 10 and day 14 observation intervals, mortality either approached 90% or was greater than 90% in all treatments except in Formulation C.

TABLE 5

Percentage of dead American cockroaches in different treatments.

| | % Dead (±Standard Error) | | | | | |
|---|---|---|---|---|---|---|
| Treatment | Day 1 | Day 3 | Day 5 | Day 7 | Day 10 | Day 14 |
| Formulation A | 1 (±1)a | 6 (±1)d | 35 (±3)d | 76 (±4)b | 92 (±3)ab | 97 (±3)a |
| Formulation B | 0 (±0)a | 11 (±1)d | 41 (±6)cd | 64 (±4)c | 88 (±5)b | 94 (±4)a |
| Formulation C | 6 (±3)a | 37 (±2)b | 47 (±4)c | 48 (±4)d | 50 (±5)c | 52 (±6)b |
| Formulation D | 3 (±1)a | 55 (±3)a | 85 (±2)a | 94 (±2)a | 98 (±2)a | 99 (±1)a |
| Formulation E | 1 (±1)a | 22 (±3)c | 61 (±5)b | 83 (±2)b | 94 (±2)ab | 98 (±1)a |
| Control | 1 (±1)a | 1 (±1)e | 1 (±1)e | 1 (±1)e | 2 (±2)d | 2 (±2)c |

Within each column, percent mortality values that are not connected with the same letter are significantly different (ANOVA and LSD test P<0.05).

Bait Consumption

Bait consumption was estimated for the first 24 h of the bioassay. Bait consumption values for Formulation A (0.50 g) were statistically similar to Formulation D (around 0.44 g), but significantly higher than Formulation C, Formulation B, and Formulation E. Bait consumption for Formulation B and Formulation E (around 0.30 g) was the lowest in comparison to other treatments (Table 6).

TABLE 6

Bait consumption estimates for the first 24 h of the bioassay.

| Treatment | Bait consumption (g) at 24 h by 25 American cockroaches (± Standard Error) |
|---|---|
| Formulation A | 0.50 (±0.07)a |
| Formulation B | 0.32 (±0.06)bc |
| Formulation C | 0.35 (±0.04)bc |
| Formulation D | 0.44 (±0.08)ab |
| Formulation E | 0.29 (±0.03)c |

Estimates are based on average bait consumption by 25 American cockroaches (×5 replicates total). Consumption estimates connected by different letters are significantly different (ANOVA and LSD test, P<0.05).

Speed of Kill Provided by Indoxacarb-Containing Formulations

Figure 3:
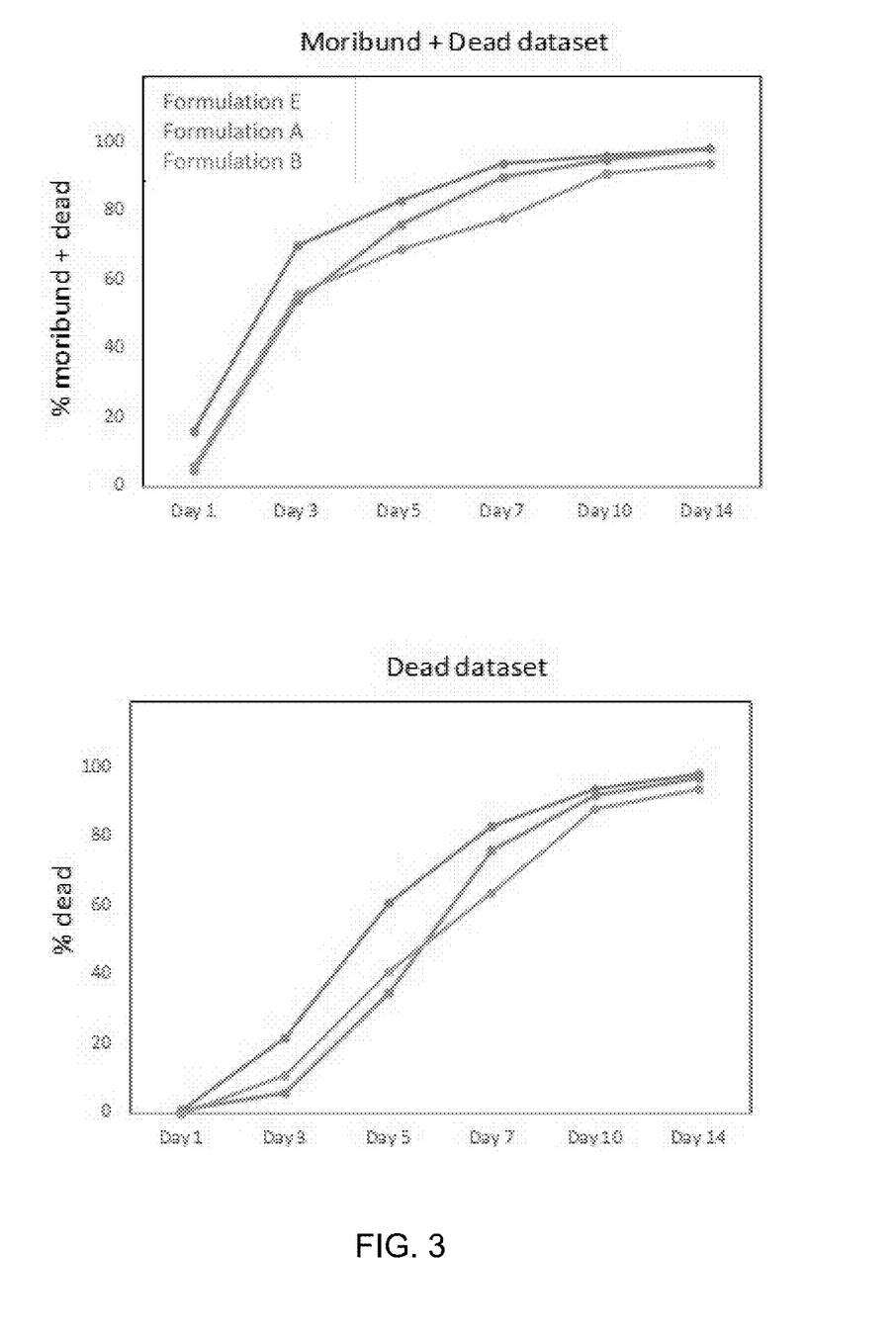
FIG. 3. Line graphs showing mortality trends observed for the three indoxacarb-containing formulations that were tested against American cockroaches.

For formulations that contained indoxacarb at various concentrations, slightly higher speed of kill or percent mortality was observed for the market standard formulation, Formulation E that possesses a higher concentration of the active ingredient (0.6%) (Tables 4, 5 and FIG. 3). However, after the first 5 and/or 7 days of the bioassay, significant differences in percent mortality levels were not observed between Formulation E (0.6% indoxacarb) and Formulations A or B (0.3% indoxacarb). In the case of baits with a lower concentration of indoxacarb, the time required to achieve 90% or higher mortality was faster for Formulation A in comparison to Formulation B (Tables 4, 5 and FIG. 3). The slightly faster speed of kill observed for Formulation A can be attributed to higher consumption of this formulations within the first 24 hours of the bioassay as shown in Table 6.

Summary of Results
1. All formulations tested in this Example, except Formulation C, provided >90% mortality of American cockroaches by day 14.
2. Formulation D provided the fastest speed of kill and also the highest mortality (99%).
3. Among the formulations with indoxacarb as an active ingredient, the market standard formulations, Formulation E, provided slightly faster speed of kill for the first 5 to 7 days of the bioassay. However, at the day 10 or day 14 observation intervals, Formulation E, Formulation A, and Formulation B provided ~90% or higher mortality.
4. Formulation A showed a slightly faster speed of kill in comparison to Formulation B.
5. Twenty five American cockroaches consumed the highest amounts (~0.5 g) of Formulation A and Formulation D within the first 24 hours of the bioassay, followed by Formulation C, Formulation B, and Formulation E.

As described above, among the formulations with indoxacarb as an active ingredient, the insecticidal gel formulations disclosed herein show similar speed of kill compared to commercially available indoxacarb-containing formulations, even though both Formulations A and B as presently disclosed contained 50% less indoxacarb compared to the market standard formulation E. For American cockroaches both Formulations A and B showed around 90% mortality in 10-14 days. For German cockroaches, both Formulations A and B showed around 90% mortality in 5-7 days.

Further, the combination of hydrophilic fumed silica and xanthan gum provided as a structuring agent to the insecticidal gel formulations disclosed provides good rheology and improved thixotropic properties. The combination of structuring agents provides the insecticidal gel formulation the advantage of compatibility with attractant agents and AIs, as exemplified in Formulations A and B, and by remaining in gel form for about two years after application in order to provide efficient pest control and killing of insects.

The disclosed gel insecticidal composition controls and kills crawling insects in a quick and efficient manner, and is a single product that remains effective for a long period. The disclosed gel insecticidal formulation may be sugar- or protein-based. The structuring agents disclosed herein can be used with both sugar- and protein-based formulations. In one embodiment of a sugar-based formulation, the gel insecticidal composition is off-white in color and demonstrates efficacy similar to that of darker protein-based formulations.

INDUSTRIAL APPLICABILITY

Numerous modifications to the present invention will be apparent to those skilled in the art in view of the foregoing description. Accordingly, this description is to be construed as illustrative only and is presented for the purpose of enabling those skilled in the art to make and use the invention and to teach the best mode of carrying out same. The exclusive rights to all modifications which come within the scope of the appended claims are reserved.

We claim:
1. An insecticide gel formulation, comprising: an insecticide active agent, wherein the insecticide active agent is indoxacarb;
sugar;
sorbitol;
a structuring agent comprising from about 2.5% to about 4.0% by weight of a hydrophilic fumed silica and from about 0.05% to about 0.5% by weight of a xanthan gum, based on total weight of the insecticide gel formulation; and
a solvent;
wherein under force the viscosity of the insecticidal gel formulation decreases as the shear rate increases;
wherein not under force the insecticidal gel formulation remains intact and the viscosity remains substantially the same from about 4° C. to about 49° C.; and
wherein not under force and within a temperature range from about 4° C. to about 49° C. a storage modulus of the insecticidal gel formulation is higher than a loss modulus of the insecticidal gel formulation.

2. The formulation of claim 1, additionally comprising about 10% to about 25% by weight protein based on total weight of the insecticide gel formulation.

3. The formulation of claim 2, wherein the protein is peanut butter.

4. The formulation of claim 1, comprising about 0.1% to about 1.0% by weight insecticide active agent based on total weight of the insecticide gel formulation.

5. The formulation of claim 1, comprising about 20% to about 30% by weight sugar and about 20% to about 30% by weight sorbitol based on total weight of the insecticide gel formulation.

6. The formulation of claim 1, wherein the solvent is water and the formulation comprises about 25% to about 45% by weight water based on total weight of the insecticide gel formulation.

7. The formulation of claim 1, additionally comprising about 0.01% to about 2% by weight emulsifier based on total weight of the insecticide gel formulation.

8. The formulation of claim 1, additionally comprising about 0.01% to about 0.1% by weight bittering agent based on total weight of the insecticide gel formulation.

9. An insecticide gel formulation, comprising:
an insecticide active agent, wherein the insecticide active agent is indoxacarb;
sugar;
sorbitol;
a structuring agent comprising from about 2.5% to about 4.0% by weight of a hydrophilic fumed silica and from about 0.05% to about 0.5% by weight of a xanthan gum, based on the total weight of the insecticide gel formulation;
a bittering agent; and
a solvent;
wherein under force the viscosity of the insecticidal gel formulation decreases as the shear rate increases;
wherein not under force the insecticidal gel formulation remains intact and the viscosity remains substantially the same from about 4° C. to about 49° C.; and
wherein not under force and within a temperature range from about 4° C. to about 49° C., a storage modulus of the insecticidal gel formulation is higher than a loss modulus of the insecticidal gel formulation.

10. The formulation of claim 9, additionally comprising about 10% to about 25% by weight protein based on total weight of the insecticide gel formulation.

11. The formulation of claim 10, wherein the protein is peanut butter.

12. The formulation of claim 9, comprising about 20% to about 30% by weight sugar and about 20% to about 30% by weight sorbitol based on total weight of the insecticide gel formulation.

13. The formulation of claim 9, comprising about 0.1% to about 1.0% by weight insecticide active agent and about 0.01% to about 0.1% by weight bittering agent based on total weight of the insecticide gel formulation.

14. The formulation of claim 9, wherein the solvent is water and the formulation comprises about 25% to about 45% by weight water based on total weight of the insecticide gel formulation.

15. The formulation of claim 9, additionally comprising about 0.01% to about 2% by weight emulsifier based on total weight of the insecticide gel formulation.

16. An insecticide gel formulation, consisting of:
an insecticide active agent, wherein the insecticide active agent is indoxacarb;
sugar;
sorbitol;
protein;
emulsifier;
bittering agent;
a structuring agent consisting of from about 2.5% to about 4.0% by weight of a hydrophilic fumed silica and from about 0.05% to about 0.5% by weight of a xanthan gum, based on total weight of the insecticide gel formulation; and
a solvent;
wherein under force the viscosity of the insecticidal gel formulation decreases as the shear rate increases;
wherein not under force the insecticidal gel formulation remains intact and the viscosity remains substantially the same from about 4° C. to about 49° C.; and
wherein not under force and within a temperature range from about 4° C. to about 49° C., a storage modulus of the insecticidal gel formulation is higher than a loss modulus of the insecticidal gel formulation.

17. The formulation of claim 16, wherein the protein is peanut butter and the formulation comprises about 10% to about 25% by weight peanut butter based on total weight of the insecticide gel formulation.

18. The formulation of claim 16, comprising about 20% to about 30% by weight sugar and about 20% to about 30% by weight sorbitol based on total weight of the insecticide gel formulation.

19. The formulation of claim 16, comprising about 0.1% to about 1.0% by weight insecticide active agent based on total weight of the insecticide gel formulation.

20. The formulation of claim 16, comprising about 0.01% to about 2% by weight emulsifier based on total weight of the insecticide gel formulation.

21. The formulation of claim 16, comprising about 0.01% to about 0.1% by weight bittering agent based on total weight of the insecticide gel formulation.

22. The formulation of claim 1, comprising, based on the total weight of the formulation:
about 0.1 to about 1.0% by weight indoxacarb;
about 20% to about 30% by weight sugar;
about 20% to about 30% by weight sorbitol;
about 2.5% to about 4.0% by weight hydrophilic fumed silica;
about 0.05% to about 0.5% by weight xanthan gum;
about 2% by weight peanut oil;
about 0.01% to about 2.0% by weight emulsifier;
about 0.01% to about 0.1% by weight bittering agent; and
about 25% to about 45% by weight water.

23. The formulation of claim 22, comprising about 10% to about 25% by weight protein based on the total weight of the insecticide gel formulation.

24. The formulation of claim 23, wherein the protein is peanut butter.

25. The formulation of claim 22, comprising, based on the total weight of the formulation:
about 0.3% by weight indoxacarb;
about 25% by weight sugar;
about 25% by weight sorbitol;
about 3.5% by weight hydrophilic fumed silica;
about 0.15% by weight xanthan gum;
about 2% by weight peanut oil;
about 1% by weight emulsifier;
about 0.05% by weight bittering agent; and
about 42% to about 43% by weight water.

26. The formulation of claim 25, wherein the formulation further comprises a protein.

27. The formulation of claim 26, wherein the protein is peanut butter.

* * * * *